United States Patent
Ishitsuka et al.

(10) Patent No.: US 9,422,753 B2
(45) Date of Patent: Aug. 23, 2016

(54) VEHICULAR ELECTRIC LOCK DEVICE

(75) Inventors: Takashi Ishitsuka, Miyazaki (JP); Kunihiro Kuroda, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 372 days.

(21) Appl. No.: 13/989,348

(22) PCT Filed: Aug. 31, 2011

(86) PCT No.: PCT/JP2011/069724
§ 371 (c)(1),
(2), (4) Date: Jun. 18, 2013

(87) PCT Pub. No.: WO2012/081283
PCT Pub. Date: Jun. 21, 2012

(65) Prior Publication Data
US 2013/0257063 A1 Oct. 3, 2013

(30) Foreign Application Priority Data

Dec. 17, 2010  (JP) ................................. 2010-282059
Dec. 17, 2010  (JP) ................................. 2010-282060

(51) Int. Cl.
*B60R 25/02* (2013.01)
*E05B 81/40* (2014.01)
(Continued)

(52) U.S. Cl.
CPC .............. *E05B 81/40* (2013.01); *B60R 25/02* (2013.01); *B60R 25/0211* (2013.01); *B60R 25/02153* (2013.01); *E05B 81/06* (2013.01); *Y10T 292/1021* (2015.04)

(58) Field of Classification Search
CPC ............ B60R 25/02153; B60R 25/02; B60R 25/0211; E05B 81/06; E05B 81/40

USPC .................. 70/182–186, 190, 191, 252, 256, 70/245–247, 275, 277, 278.1; 292/137, 292/144, 142, 279
See application file for complete search history.

(56) References Cited

U.S. PATENT DOCUMENTS 6,776,251 B2 * 8/2004 Landmann .................... 180/287
7,086,256 B2 * 8/2006 Hasegawa ....................... 70/186
(Continued)

FOREIGN PATENT DOCUMENTS

CN     2082698 U     8/1991
CN     2165042 Y     5/1994
(Continued)

OTHER PUBLICATIONS

Supplementary European Search Report dated Jun. 26, 2014 issued in European Patent Application No. 11 84 8510.
(Continued)

*Primary Examiner* — Alyson M Merlino
(74) *Attorney, Agent, or Firm* — Arent Fox LLP

(57) ABSTRACT

A vehicular electric lock device is provided in which a magnet is provided in a slider which is operated linearly in response to rotation of an electric motor and is operatively linked to a lock member, and a magnetic sensor detects by means of a magnetic field of the magnet that the lock member is in at least one of a lock position and a unlock position, wherein the slider comprises a screw-fitting member that is formed from a ferromagnetic material having rigidity and has a threaded shaft screwed thereinto and a magnet retaining member that is formed from a paramagnetic material, covers the screw-fitting member and retains the magnet, and the magnet retaining member is coupled to the screw-fitting member while preventing a relative movement in the direction along an axis of the threaded shaft and relative rotation around the axis of the threaded shaft.

2 Claims, 7 Drawing Sheets

(51) Int. Cl.
*B60R 25/021* (2013.01)
*B60R 25/0215* (2013.01)
*E05B 81/06* (2014.01)
*E05C 1/06* (2006.01)

(56) References Cited

U.S. PATENT DOCUMENTS

| | | | | |
|---|---|---|---|---|
| 7,251,968 | B2 * | 8/2007 | Hasegawa | 70/186 |
| 7,310,979 | B2 * | 12/2007 | Hasegawa | 70/186 |
| 7,328,596 | B2 * | 2/2008 | Hasegawa et al. | 70/186 |
| 7,703,309 | B2 * | 4/2010 | Okuno et al. | 70/186 |
| 7,823,426 | B2 * | 11/2010 | Okuno et al. | 70/186 |
| 7,921,684 | B2 | 4/2011 | Okuno et al. | |
| 8,256,252 | B2 | 9/2012 | Okada | |
| 2004/0148983 | A1 * | 8/2004 | Suzuki et al. | 70/186 |
| 2005/0183476 | A1 * | 8/2005 | Feucht et al. | 70/186 |
| 2008/0047309 | A1 * | 2/2008 | Okuno et al. | 70/252 |
| 2008/0098777 | A1 | 5/2008 | Tanioka et al. | |
| 2008/0105009 | A1 * | 5/2008 | Taniguchi et al. | 70/186 |
| 2010/0083716 | A1 | 4/2010 | Fukatsu et al. | |
| 2010/0236304 | A1 * | 9/2010 | Yuhi et al. | 70/224 |

FOREIGN PATENT DOCUMENTS

| | | |
|---|---|---|
| EP | 1 029 755 A2 | 8/2000 |
| EP | 1 698 530 A2 | 9/2006 |
| JP | 09-45199 A | 2/1997 |
| JP | 2000-233716 A | 8/2000 |
| JP | 2001-278009 A | 10/2001 |
| JP | 2004-049358 A | 2/2004 |
| JP | 2004-106750 A | 4/2004 |
| JP | 2007-22122 A | 2/2007 |
| JP | 2008-49908 A | 3/2008 |
| JP | 2008-105646 A | 5/2008 |
| JP | 2008-120113 A | 5/2008 |
| JP | 2010-036724 A | 2/2010 |
| JP | 2010-89532 A | 4/2010 |
| JP | 4502538 B2 | 7/2010 |
| JP | 2010-208363 A | 9/2010 |
| JP | 2010-208365 A | 9/2010 |
| JP | 2012-025269 A | 2/2012 |

OTHER PUBLICATIONS

Chinese Office Action mailed Jan. 22, 2015 for Chinese Patent Application No. 201180060365.8.
Japanese Office Action issued in Japanese Patent Application No. 2013-242862 dated Sep. 3, 2014.
Japanese Official Communication, "Decision of Granting a Patent," Application No. 2010-282059 dated Oct. 2, 2013.
Japanese Official Communication, Application No. 2010-282060 dated Oct. 2, 2013.
Japanese Office Action, dated Dec. 3, 2014, issued in Japanese Patent Application No. 2013-242862.

* cited by examiner

VEHICULAR ELECTRIC LOCK DEVICE

CROSS-REFERENCE TO RELATED APPLICATIONS

This application is a National Stage entry of International Application No. PCT/JP2011/069724, filed Aug. 31, 2011, which claims priority to Japanese Nos. 2010-282059, filed Dec. 17, 2010 and 2010-282060, filed Dec. 17, 2010. The disclosures of the prior applications are hereby incorporated in their entirety by reference

TECHNICAL FIELD

The present invention relates to a vehicular electric lock device that includes an electric motor, a lock member that is capable of moving linearly between a lock position at which the lock member engages with an operating member and an unlock position at which the lock member releases engagement with the operating member, a threaded shaft that is rotatingly driven by the electric motor, a slider that has the threaded shaft screwed thereinto but cannot rotate around an axis of the threaded shaft and that is operatively linked to the lock member, a magnet that is provided in the slider, and a magnetic sensor that detects by means of a magnetic field of the magnet that the lock member is in at least one of the lock position and the unlock position.

BACKGROUND ART

A vehicular electric lock device in which a lock member that can engage with a steering shaft is operatively linked to a slider that moves in the axial direction of a threaded shaft in response to the threaded shaft being rotatingly driven by means of an electric motor is disclosed in Patent Document 1, Patent Document 2, etc. In the arrangement of Patent Document 1, the slider is provided with an operating arm protruding sideways, and a pair of microswitches are selectively switched by means of the operating arm, thereby mechanically detecting whether the lock member is either at a lock position or an unlock position. On the other hand, in the arrangement disclosed in Patent Document 2, a Hall sensor fixedly disposed to one side of the slider is used to detect that the lock member is at a lock position and, although it is not clearly described, it is thought that a magnet is provided on the slider in order for a magnetic field to be detected by means of the Hall sensor.

RELATED ART DOCUMENTS

Patent Document

Patent Document 1: Japanese Patent No. 4502538
Patent Document 2: Japanese Patent Application Laid-open No. 2000-233716

SUMMARY OF THE INVENTION

Problems to be Solved by the Invention

However, in the arrangement disclosed in Patent Document 1 above, it is necessary to ensure that there is space for placing the operating arm extending to one side of the slider and the pair of microswitches switched by means of the operating arm, thus causing an increase in the size of the electric lock device and thereby imposing limitations with respect to the location in which the electric lock device can be placed. On the other hand, in the arrangement disclosed in Patent Document 2, since the magnetic sensor such as the Hall sensor is smaller than the microswitch, and the magnetic sensor is disposed close to the slider, it is possible to reduce the size of the electric lock device. When the slider is of a type that has a threaded shaft screwed directly thereinto, the slider is required to have strength that can accommodate wear or changes in motion due to having the threaded shaft screwed thereinto; the slider may be formed from a ferromagnetic material such as iron, and in a structure in which a magnet is provided on such a slider, the magnetic field of the magnet is affected by the slider and becomes unstable, thus leading to the possibility that position detection by the magnetic sensor will be inaccurate.

The present invention has been accomplished in light of such circumstances, and it is an object thereof to provide a vehicular electric lock device that enables the size to be reduced and the position of a lock member to be accurately detected.

Means for Solving the Problems

In order to attain the above object, according to a first aspect of the present invention, there is provided a vehicular electric lock device comprising an electric motor, a lock member that is capable of moving linearly between a lock position at which the lock member engages with an operating member and an unlock position at which the lock member releases engagement with the operating member, a threaded shaft that is rotatingly driven by the electric motor, a slider that has the threaded shaft screwed thereinto but cannot rotate around an axis of the threaded shaft and is operatively linked to the lock member, a magnet that is provided in the slider, and a magnetic sensor that detects by means of a magnetic field of the magnet that the lock member is in at least one of the lock position and the unlock position, characterized in that the slider comprises a screw-fitting member that is formed from a ferromagnetic material having rigidity and has the threaded shaft screwed thereinto and a magnet retaining member that is formed from a paramagnetic material, covers the screw-fitting member, and retains the magnet, and the magnet retaining member is coupled to the screw-fitting member while making impossible relative movement in a direction along the axis of the threaded shaft and relative rotation around the axis of the threaded shaft.

Further, according to a second aspect of the present invention, in addition to the first aspect, the electric motor and motion conversion means that comprises the threaded shaft and the slider and is present between the electric motor and the lock member so as to convert rotary motion of the electric motor into linear motion are housed within a housing made of a magnetic material and supporting the lock member, and a magnetic shielding member is fixed to an area, corresponding to the magnetic sensor disposed at a fixed position within the housing, of inner faces of the housing so as to cover the magnetic sensor from the outside.

In addition, a toothed ring 13 of an embodiment corresponds to the operating member of the present invention, and Hall sensors 71, 72, 73, and 74 of the embodiment correspond to the magnetic sensor of the present invention.

Effects of the Invention

In accordance with the first aspect of the present invention, since the screw-fitting member, which has the threaded shaft screwed thereinto, is formed from a ferromagnetic material having rigidity, it is possible to ensure that it has a strength that can accommodate wear or changes in motion due it having the threaded shaft screwed thereinto, and since the magnet is retained by the magnet retaining member that is formed from a paramagnetic material and covers the screw-fitting member, it is possible to suppress the influence of the screw-fitting member on the magnetic field of the magnet that is detected by the magnetic sensor, thus enabling the lock position and the unlock position of the lock member to be accurately detected, and placing the magnetic sensor close to the slider enables the size of the electric lock device to be reduced, thus increasing the degree of freedom in terms of layout of the electric lock device.

Furthermore, in accordance with the second aspect of the present invention, since the magnetic shielding member, which covers the magnetic sensor from the outside, is fixed to an inner face of the housing, even if another magnet is disposed in the vicinity of an outer face of the housing, which is formed from a paramagnetic material, it is possible to prevent erroneous detection from occurring due to the magnet affecting the magnetic sensor, thereby enabling the position of the lock member to be accurately detected.

EXPLANATION OF REFERENCE NUMERALS AND SYMBOLS

Figure 1:
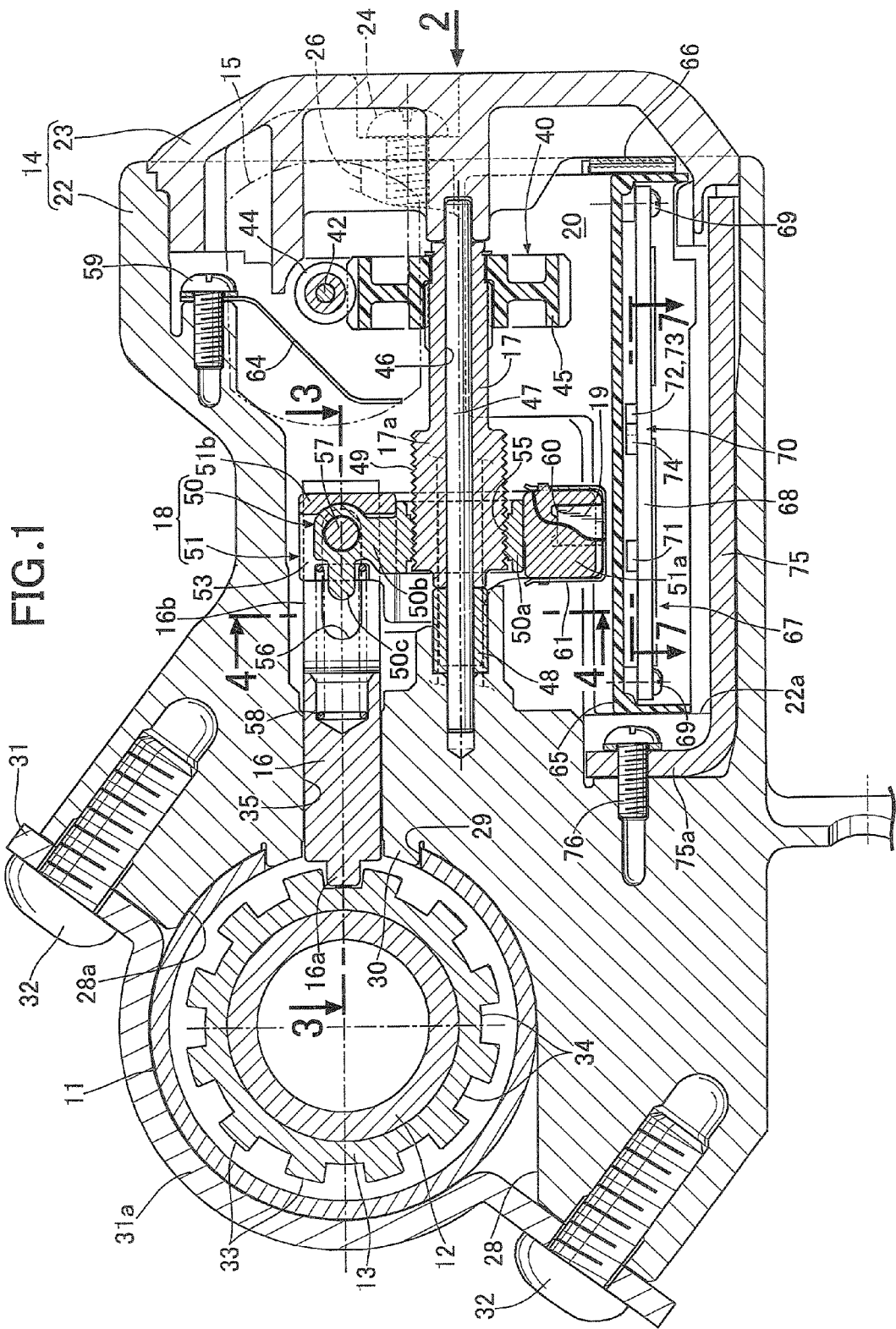
FIG. 1 is a sectional view along line 1-1 in FIG. 2, which is a vertical sectional view of a vehicular electric lock device in a state in which a lock member is at a lock position. (first embodiment)

13 Toothed ring, which is an operating member
14 Housing
15 Electric motor
16 Lock member
17 Threaded shaft
18 Slider
19 Magnet
40 Motion conversion means
50 Screw-fitting member
51 Magnet retaining member
71, 72, 73, 74 Hall sensor, which is a magnetic sensor
75 Magnetic shielding member

MODES FOR CARRYING OUT THE INVENTION

A mode for carrying out the present invention is explained by reference to the attached FIG. 1 to FIG. 7.

EMBODIMENT 1

First, in FIG. 1, secured to a steering shaft 12 pivotably disposed within a steering column 11 of a passenger vehicle so as to coaxially surround the steering shaft 12 is a toothed ring 13 as an operating member, and fixed to the steering column 11 is a housing 14 of a vehicular electric lock device engaging with the outer periphery of the toothed ring 13 so as to prevent pivoting of the toothed ring 13, that is, the steering shaft 12.

Figure 2:
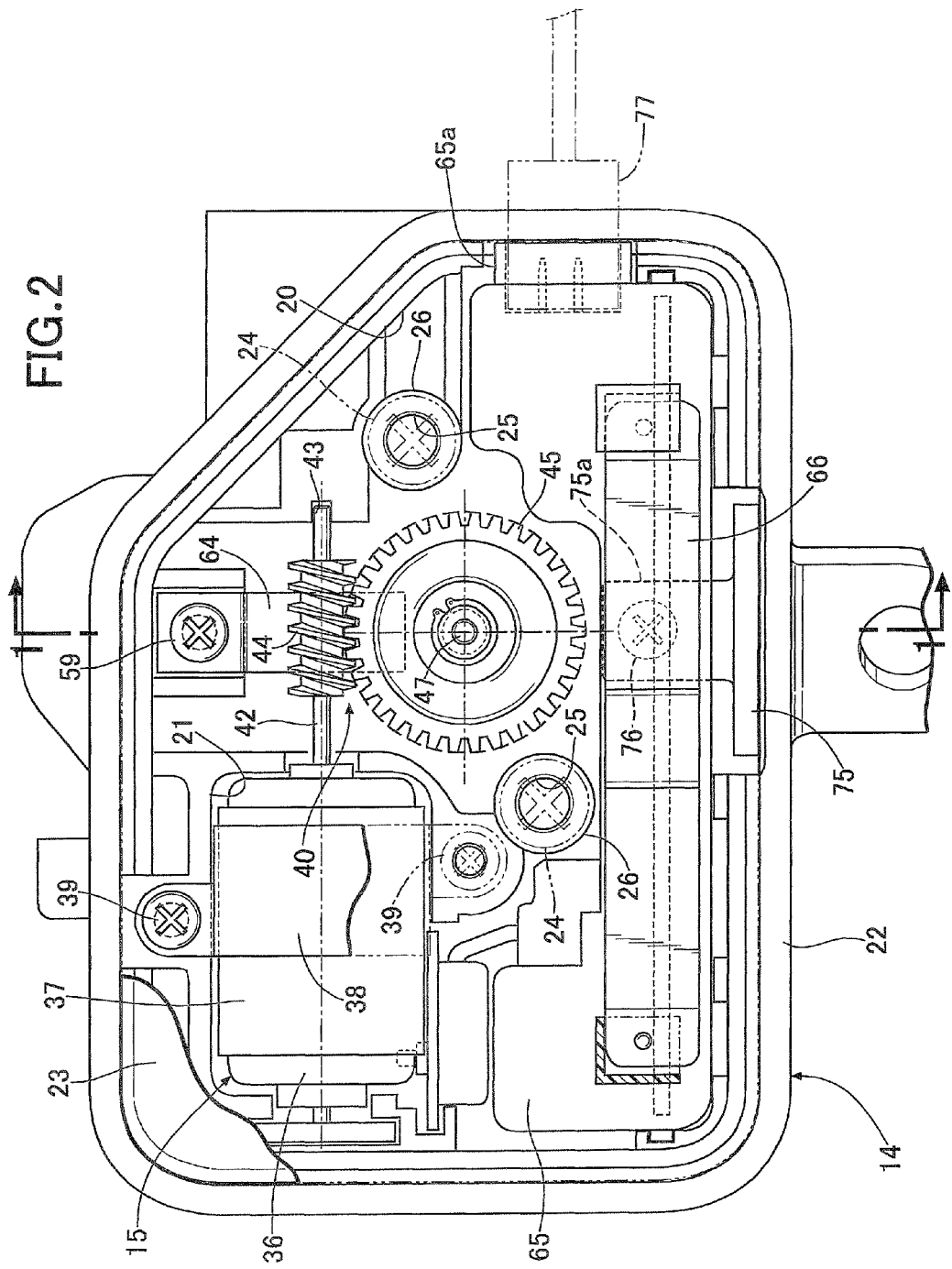
FIG. 2 is a view in the direction of arrow 2 in FIG. 1 in a state in which a lid member is removed. (first embodiment)

Referring in addition to FIG. 2, the vehicular electric lock device includes the housing 14, an electric motor 15, a lock member 16 that can move linearly between a lock position in which it engages with the toothed ring 13 and an unlock position in which it releases engagement with the toothed ring 13, a threaded shaft 17 that is rotatingly driven by the electric motor 15, a slider 18 that has the threaded shaft 17 screwed thereinto but cannot rotate around the axis of the threaded shaft 17 and that is operatively linked to the lock member 16, and a pair of magnets 19 provided in the slider 18, the electric motor 15, the lock member 16, the threaded shaft 17, the slider 18, and the magnets 19 being housed and retained within the housing 14.

The housing 14 is formed from a housing main body 22 that has first and second housing recesses 20 and 21 opening on the side opposite to the steering column 11, and a lid member 23 fastened to the housing main body 22 so as to close the open ends of the first and second housing recesses 20 and 21, the housing main body 22 and the lid member 23 being formed from a paramagnetic material, such as for example a zinc alloy or a magnesium alloy.

Integrally provided with the housing main body 22 so as to be disposed within the first housing recess 20 are a pair of bosses 26 and 26 having bottomed threaded holes 25 and 25 having screwed thereinto a pair of screw members 24 and 24 inserted through the lid member 23.

Furthermore, provided on the housing main body 22 on the steering column 11 side so as to house substantially half of the periphery of the steering column 11 is a housing recess 28 having an arc face 28a that is in contact with part of the outer periphery of the steering column 11. A protruding part 30 that is inserted into and engaged with an engagement hole 29 provided in the steering column 11 is integrally and projectingly provided on the housing main body 22 so as to protrude from the arc face 28a. Moreover, an arc portion 31a of a column holder 31 abuts against the remaining substantially half of the outer periphery of the steering column 11 that projects from the housing recess 28, and on opposite sides of the steering column 11 opposite end portions of the column holder 31 are fastened to the housing main body 22 by special screw members 32 and 32 that cannot be detached by means of a usual tool, this allowing the housing main body 22 to be fixed to the steering column 11.

A plurality of teeth 33 are provided on the outer periphery of the toothed ring 13 at equal intervals in the peripheral direction so as to form latching recesses 34 therebetween. The lock member 16 having at an extremity an engagement projection portion 16a that can be engaged with one of the latching recesses 34 is formed into a flat plate shape having a rectangular cross-sectional shape that extends lengthwise in a direction perpendicular to the axes of the steering column 11 and the steering shaft 12, and is slidably fitted into a guide hole 35 provided in the housing main body 22. The guide hole 35 extends in a direction perpendicular to the axes of the steering column 11 and the steering shaft 12 and is provided in the housing main body 22, one end of the guide hole 35 opening in a central portion of the extremity of the protruding part 30 provided on the housing main body 22 so as to engage with the engagement hole 29 of the steering column 11, and the other end of the guide hole 35 opening in the first housing recess 20.

The electric motor 15, which has an axis parallel to the steering shaft 12 and the steering column 11, is disposed at a position at which it sandwiches the lock member 16 between itself and the steering shaft 12 in a projection onto a plane perpendicular to the axes of the steering shaft 12 and the steering column 11. Part of a motor housing 36 of the electric motor 15 is housed in the second housing recess 21, which is shallower than the first housing recess 20. An elastic sheet 37 is wrapped around the outer periphery of the motor housing 36, a motor holder 38 abuts against a portion, projecting from the second housing recess 21, of the motor housing 36 via the elastic sheet 37, and fastening the motor holder 38 to the housing main body 22 by means of screw members 39 and 39 disposed on opposite sides of the motor housing 36 allows the motor housing 36 to be fixedly supported on the housing main body 22.

The electric motor 15 has a motor shaft 42 projecting from the motor housing 36 toward the first housing recess 20 side, and a support recess 43 for rotatably supporting a projecting end part of the motor shaft 42 is formed in the housing main body 22.

Disposed between the electric motor 15 and the lock member 16 is motion conversion means 40 that converts rotary motion of the electric motor 15 into linear motion of the lock member 16, the motion conversion means 40 being formed from a worm gear 44 fixedly provided on an axially intermediate part of the motor shaft 42, a worm wheel 45 meshing with the worm gear 44, the threaded shaft 17 having the worm wheel 45 fixed to one end thereof, and the slider 18 that has the threaded shaft 17 screwed thereinto but cannot rotate around the axis of the threaded shaft 17 and that is operatively linked to the lock member 16.

The worm gear 44, the worm wheel 45, the threaded shaft 17, and the slider 18 are disposed in the first housing recess 20. A support hole 46 is coaxially provided in the threaded shaft 17 so as to extend to opposite ends thereof, and a support shaft 47 having an axis extending in parallel to the guide hole 35 extends through the support hole 46, thus allowing the threaded shaft 17 to be rotatably supported by the support shaft 47.

Opposite end portions, projecting from the threaded shaft 17, of the support shaft 47 are fitted into and supported on the housing main body 22 and the lid member 23, the threaded shaft 17 and a cylindrical bush 48 surrounding the support shaft 47 are disposed between the housing main body 22 and the lid member 23, and a male thread 49 is provided on the outer periphery of a large diameter shaft portion 17a provided on an end, on the bush 48 side, of the threaded shaft 17.

Figure 3:
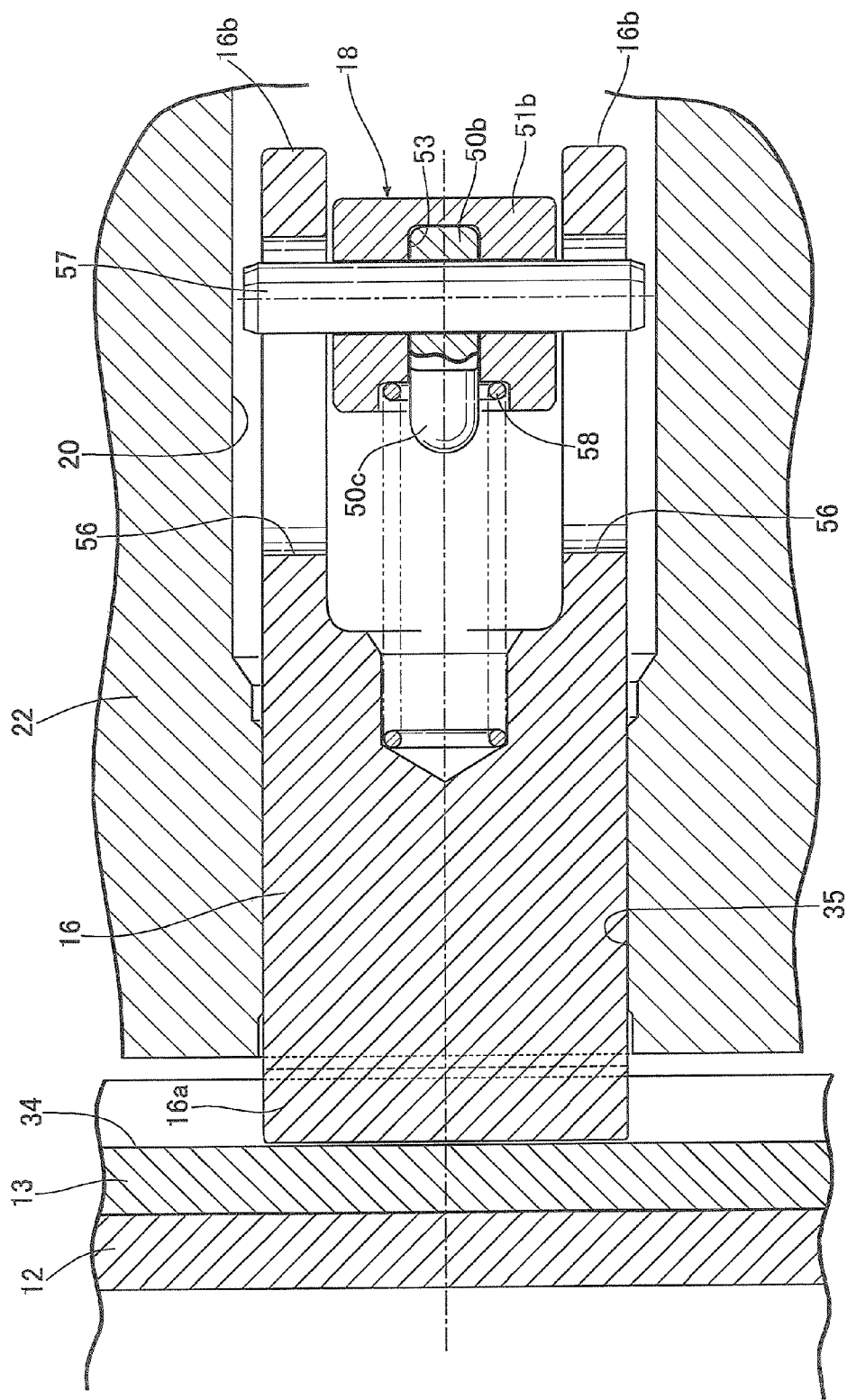
FIG. 3 is a sectional view along line 3-3 in FIG. 1. (first embodiment)
Figure 4:
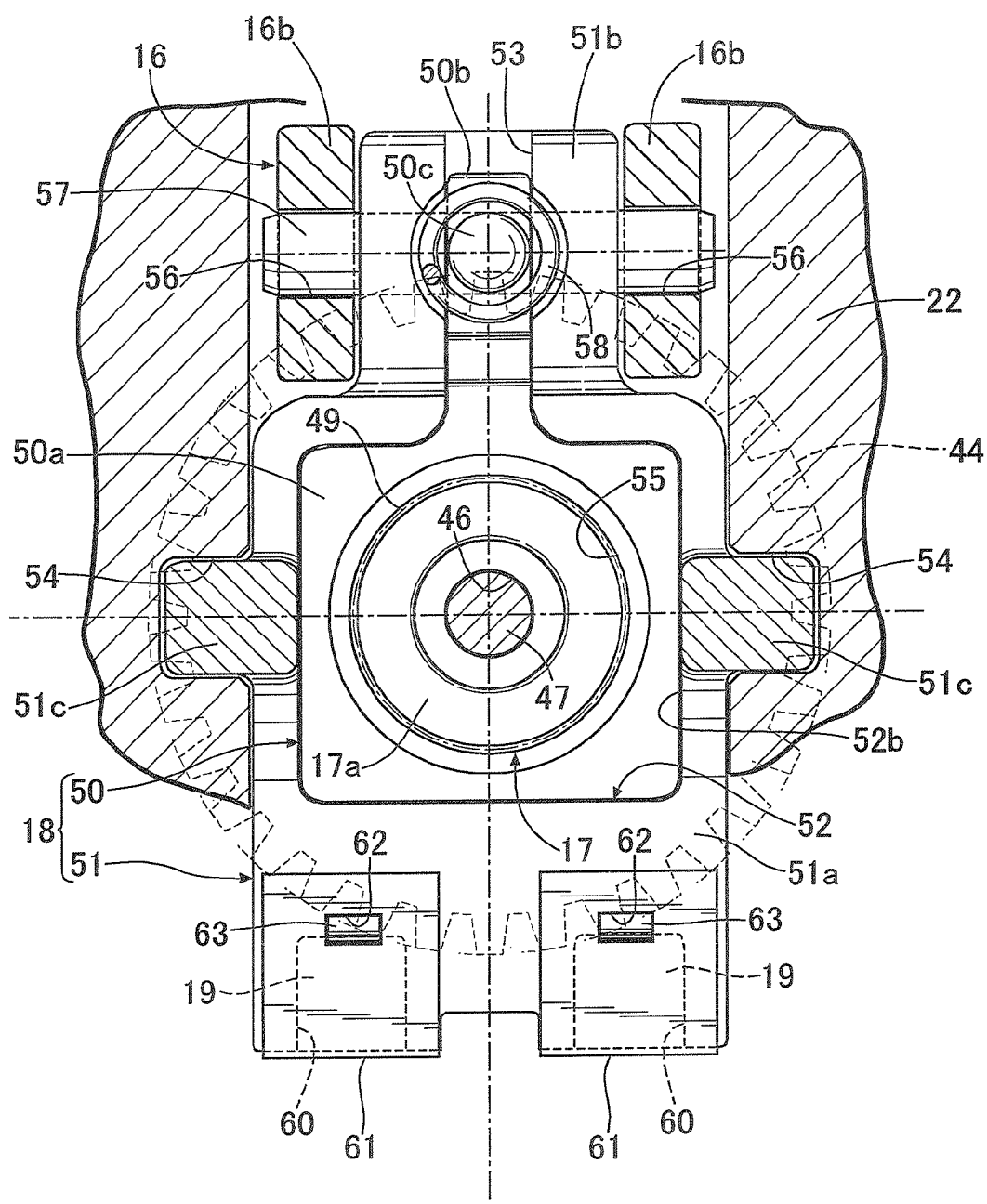
FIG. 4 is a sectional view along line 4-4 in FIG. 1. (first embodiment)
Figure 5:
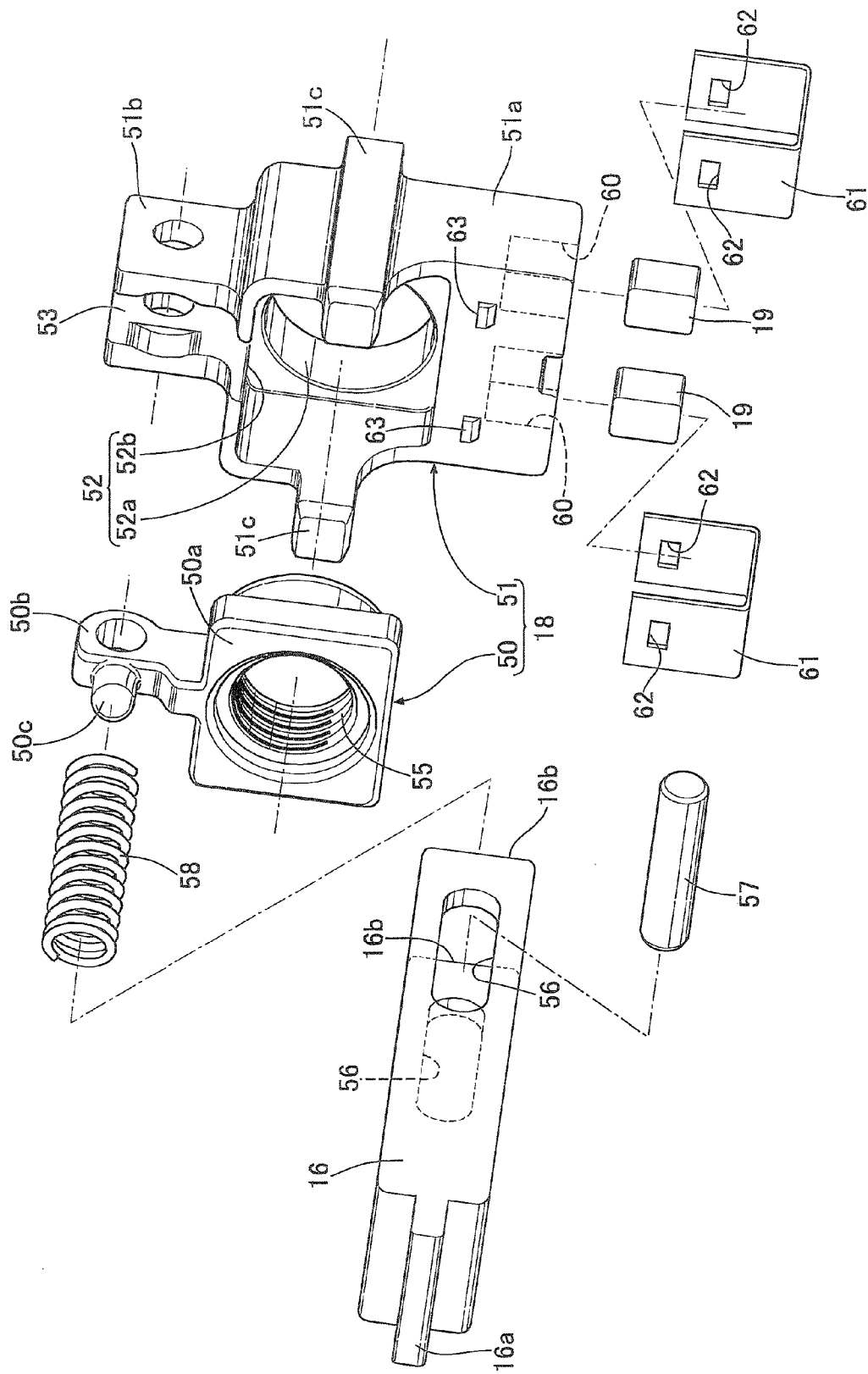
FIG. 5 is an exploded perspective view of a slider and the lock member. (first embodiment)

Referring in addition to FIG. 3 to FIG. 5, the slider 18 includes a screw-fitting member 50 formed from a ferromagnetic material having rigidity, such as for example an iron material, into which the male thread of the threaded shaft 17 is screwed, and a magnet retaining member 51 formed from a paramagnetic material such as for example a zinc alloy and covering the screw-fitting member 50; the screw-fitting member 50 and the magnet retaining member 51 are coupled to each other relatively movably in a direction along the axis of the threaded shaft 17 and relatively non-rotatably around the axis of the threaded shaft 17.

The magnet retaining member 51 integrally has a retaining member main portion 51a having a press fitting hole 52 formed by joining a circular hole portion 52a and a non-circular hole portion 52b having a substantially rectangular shape, an arm portion 51b extending from the retaining member main portion 51a toward the lock member 16 side, and a pair of guide protruding portions 51c and 51c connectedly provided at opposite side parts of the retaining member main portion 51a and extending in parallel to the threaded shaft 17; the arm portion 51b is provided with a groove 53 extending through its entire length so as to open toward the steering column 11 and steering shaft 12 side and have its inner end communicating with the press fitting hole 52.

Guide grooves 54 and 54 are provided in opposite side faces of the first housing recess 20 of the housing main body 22 so as to extend in parallel to the support shaft 47 and the threaded shaft 17, the guide protruding portions 51c and 51c of the magnet retaining member 51 being slidably fitted into the guide grooves 54 and 54. The magnet retaining member 51 and the screw-fitting member 50 can, by being guided by the two guide grooves 54, move in the axial direction of the support shaft 47 and the threaded shaft 17 while being unable to rotate around the axes of the support shaft 47 and the threaded shaft 17.

The screw-fitting member 50 integrally has a screw-fitting member main portion 50a press-fitted into the press fitting hole 52 in the retaining member main portion 51a of the magnet retaining member 51, a link arm portion 50b provided so as to extend from the screw-fitting member main portion 50a while being inserted into the groove 53 of the arm portion 51b of the magnet retaining member 51, and a spring receiving protruding portion 50c provided so as to project from the extremity of the link arm portion 50b toward the steering column 11 side. The retaining member main portion 51a is provided with a threaded hole 55 into which the male thread 49 of the threaded shaft 17 is screwed.

On the other hand, integrally provided with the other end of the lock member 16 are a pair of linking wall portions 16b and 16b sandwiching the arm portion 51b of the magnet retaining member 51 and the link arm portion 50b of the screw-fitting member 50 from opposite sides, and provided in these linking wall portions 16b are elongated holes 56 and 56 extending lengthwise in the longitudinal direction of the guide hole 35. Furthermore, a pin 57 is press-fitted so as to extend through the arm portion 51b of the magnet retaining member 51 and the link arm portion 50b of the screw-fitting member 50, and opposite end portions of the pin 57 are inserted into the elongated holes 56.

A coil spring 58 is housed between the two linking wall portions 16b of the lock member 16; one end of this coil spring 58 abuts against an extremity part of the arm portion 51b of the magnet retaining member 51 so that the spring receiving protruding portion 50c of the screw-fitting member 50 is fitted thereinto, and the other end of the coil spring 58 abuts against the lock member 16. By virtue of the spring force exhibited by this coil spring 58, the lock member 16 is urged toward the toothed ring 13 side, that is, the lock position side, in a range that enables the pin 57 to move within the elongated holes 56.

The threaded shaft 17 rotates in one direction in response to rotation of the electric motor 15 in one direction; when as shown in FIG. 1 the slider 18 moves toward the toothed ring 13 side the slider 18 pushes the lock member 16 toward the lock position side via the coil spring 58, and when one of the latching recesses 34 on the outer periphery of the toothed ring 13 is at a position corresponding to the engagement projection portion 16a of the lock member 16, the lock member 16 moves to the lock position and the engagement projection portion 16a engages with the latching recess 34. Furthermore, when the engagement projection portion 16a abuts against one of the teeth 33 on the outer periphery of the toothed ring 13, the slider 18 moves toward the toothed ring 13 side while compressing the coil spring 58, and slightly pivoting the steering shaft 12 to a position where one of the latching recesses 34 corresponds to the engagement projection portion 16*a* allows the lock member 16 to move to the lock position at which the engagement projection portion 16*a* is engaged with the latching recess 34 by virtue of the spring force of the coil spring 58.

Figure 6:
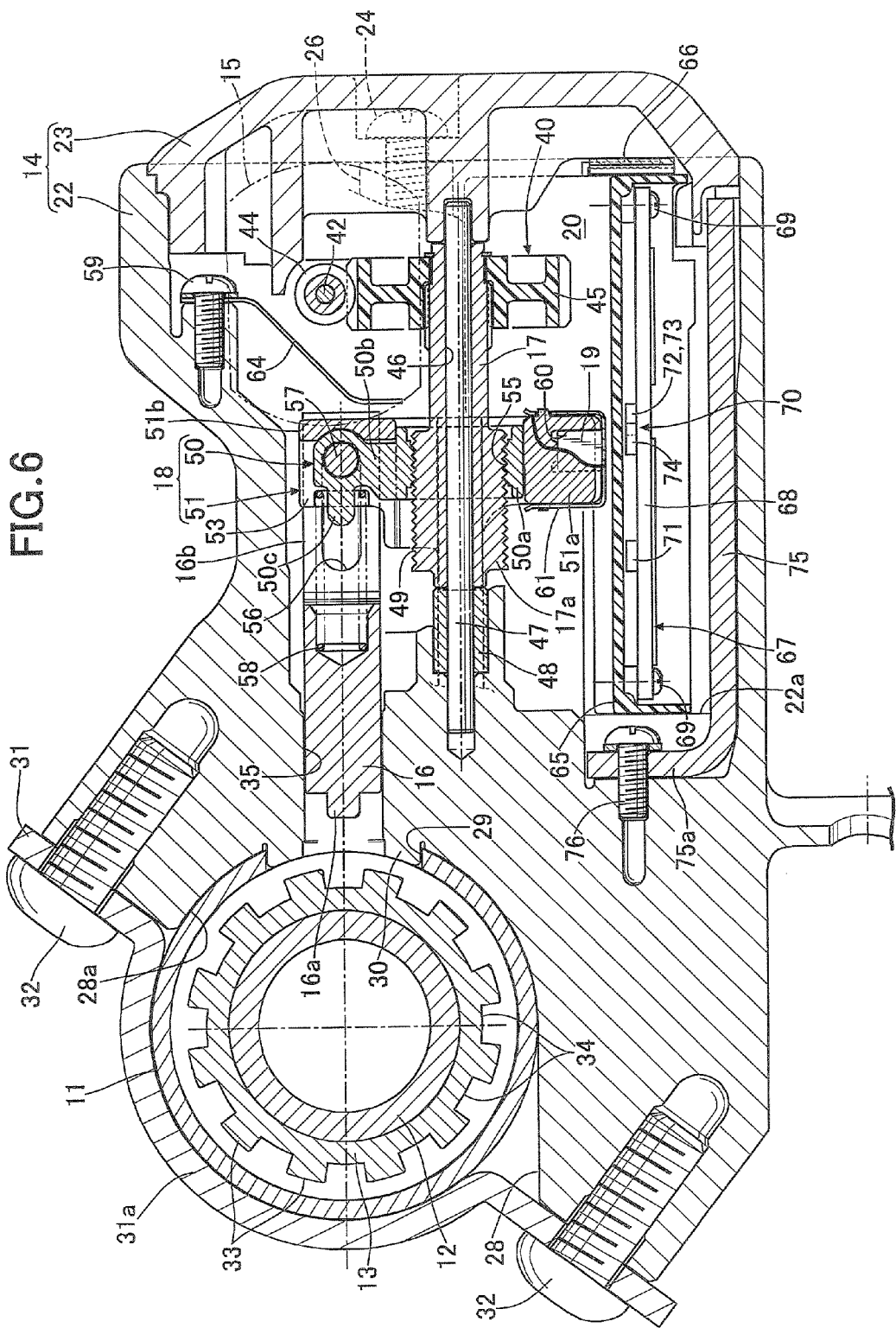
FIG. 6 is a sectional view, corresponding to FIG. 1, in a state in which the lock member is at an unlock position. (first embodiment)

When the threaded shaft 17 rotates in the other direction in response to rotation of the electric motor 15 in the other direction and as shown in FIG. 6 the slider 18 moves to the side away from the toothed ring 13, the pin 57 abuts against the end, opposite to the toothed ring 13, of the elongated holes 56 provided in the linking wall portions 16*b* of the lock member 16, and the lock member 16 moves to the unlock position together with the slider 18.

When the lock member 16 and slider 18 move toward the unlock position side, in order to restrict the moving end when rotation of the electric motor 15 does not stop due to some problem in spite of position detection means 70, which is described later, having detected the unlock position, and in addition in order to screw the male thread 49 of the threaded shaft 17 into the threaded hole 55 of the slider 18 again when the electric motor 15 rotates in reverse if the male thread 49 has unscrewed from the threaded hole 55 due to operation of the electric motor 15 not being stopped, a stopper 64 formed from a plate spring is fastened to the housing main body 22 by means of a screw member 59.

Provided in the retaining member main portion 51*a* of the magnet retaining member 51 are a pair of magnet housing recesses 60 and 60 opening on a side face, on the side opposite to the side where the arm portion 51*b* is connectedly provided, of the retaining member main portion 51*a* at the same position along the direction of movement of the slider 18. The magnets 19 are housed in the magnet housing recesses 60, and holders 61 and 61 for housing and retaining the magnets 19 within the magnet housing recesses 60 are mounted on the retaining member main portion 51*a*.

The holders 61 are formed into a substantially U shape from a paramagnetic material such as for example a copper alloy, and are fitted onto a side part, on the side opposite to the side where the arm portion 51*b* is connectedly provided, of the retaining member main portion 51*a* so as to cover the magnet housing recesses 60. Due to engagement projection parts 63 projectingly provided on the retaining member main portion 51*a* being engaged with engagement holes 62 provided in opposite end portions of the holders 61, the holders 61 are fitted onto the magnet retaining member 51 so as to retain the magnets 19 in the magnet retaining member 51.

A case 65, made of a synthetic resin, that is formed into a box shape opening on the side opposite to the slider 18 and opposing the slider 18 from the side opposite to the lock member 16 is inserted into the first housing recess 20 of the housing main body 22. Opposite end portions of a plate spring 66 resiliently abutting against the lid member 23 are retained on end parts, on the lid member 23 side, of the case 65, and by virtue of an elastic force exhibited by the plate spring 66 the case 65 is pressed against an abutment support face 22*a* provided at the inner end of the housing main body 22 and housed within and fixed to the first housing recess 20.

Mounted within the case 65 by means of a plurality of screw members 69 is a board 68 of a control unit 67 for controlling the operation of the electric motor 15.

Figure 7:
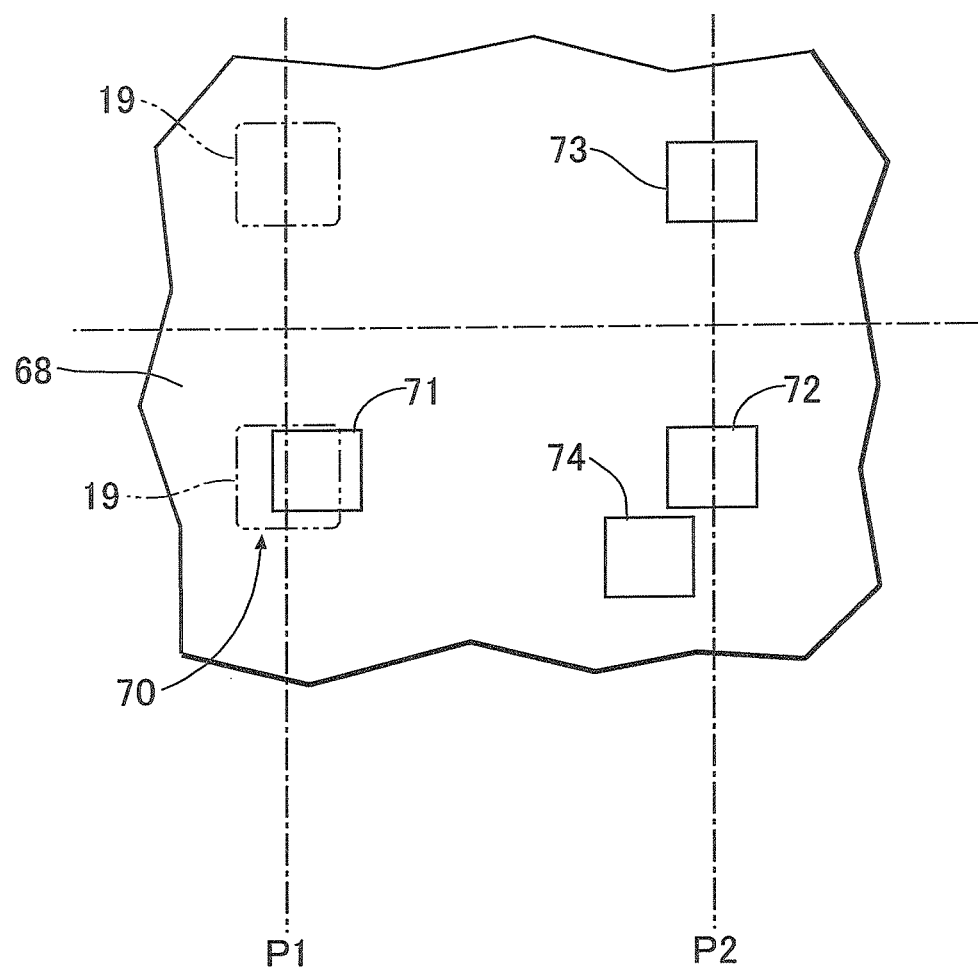
FIG. 7 is a view in which part of a board is viewed in the direction of arrowed line 7-7 in FIG. 1. (first embodiment)

Referring in addition to FIG. 7, position detection means 70 detects that the lock member 16 is in at least one of the lock position and the unlock position, in this embodiment in a position just before the unlock position in addition to the lock position and the unlock position, this position detection means 70 being formed from the pair of magnets 19 and Hall sensors 71, 72, 73, and 74, which are magnetic sensors disposed at fixed positions of the board 68 so as to detect the position of the lock member 16 by means of the magnetic field of the magnets 19.

The Hall sensor 71 is fixed to the board 68 at a position at which it detects by means of the magnetic field of one magnet 19 that the lock member 16 is at the lock position when the magnets 19 have moved to a position P1 together with the slider 18 in order to place the lock member 16 in the lock position, and the Hall sensors 72 and 73 are fixed to the board 68 at positions where they detects by means of the magnetic field of two of the magnets 19 that the lock member 16 is at the unlock position when the magnets 19 have moved to a position P2 together with the slider 18 in order to place the lock member 16 in the unlock position. The Hall sensor 74 detects in advance that the lock member 16 is just before the unlock position when it is moved toward the unlock position side, and is fixed to the board 68 at a position where it detects by means of the magnetic field of one magnet 19 that the lock member 16 is at a position just before the unlock position when the magnets 19 have moved to just before the position P2 together with the slider 18 when moving the lock member 16 from the lock position to the unlock position.

The control unit 67 stops the passage of electricity to the electric motor 15 when the Hall sensor 71 detects the lock position or the Hall sensors 72 and 73 detect the unlock position, and transmits that state to a vehicle-side control circuit. When the Hall sensor 74 detects that the lock member 16 is at the position just before the unlock position, the control unit 67 transmits that state to the vehicle-side control circuit in advance such that the vehicle side can be ready after the steering locked state is released, and the vehicle-side control circuit thereby carries out ID verification, etc.

A magnetic shielding member 75 is fixed to an area, corresponding to the Hall sensors 71 to 74, of the inner faces of the housing main body 22 of the housing 14 so as to cover the Hall sensors 71 to 74 from a side opposite to the magnets 19, that is, from the outside.

The magnetic shielding member 75 is formed from a ferromagnetic material such as iron into a plate shape extending in the direction of movement of the slider 18 while following the inside face of the housing main body 22, and a mounting plate portion 75*a* is mounted on the housing main body 22 by means of a screw member 76, the mounting plate portion 75*a* being connectedly provided integrally at right angles on an inner end part of the magnetic shielding member 75.

Furthermore, integrally provided with the case 65 is a connector portion 65*a* (see FIG. 2) having disposed thereon a terminal connected to a conductor extending from the board 68, provided on the housing main body 22 is an opening (not illustrated) through which the connector portion 65*a* faces the exterior, and connected to the connector portion 65*a* is an external connector 77.

The operation of this embodiment is now explained. Part of the motion conversion means 40 for converting rotary motion of the electric motor 15 into linear motion of the lock member 16 is formed from the threaded shaft 17 and the slider 18, which has the threaded shaft 17 screwed thereinto but cannot rotate around the axis of the threaded shaft 17 and which is operatively linked to the lock member 16. The magnets 19 are retained in the slider 18, the magnets 19 forming in cooperation with the Hall sensors 71 to 74 the position detection means 70 for detecting the position of the lock member 16. The slider 18 is formed from the screw-fitting member 50, which is formed from a ferromagnetic material having rigidity and has the threaded shaft 17 screwed thereinto, and the magnet retaining member 51, which is formed from a paramagnetic material, covers the screw-fitting member 50, and retains the magnets 19. The magnet retaining member 51 is coupled to the screw-fitting member 50 while making impossible relative movement in the direction along the axis of the threaded shaft 17 and relative rotation around the axis of the threaded shaft 17.

Therefore, it becomes possible by means of the screw-fitting member 50 made of a ferromagnetic material to ensure that there is a strength that can accommodate wear or changes in motion due to it having the threaded shaft 17 screwed thereinto. It is also possible to accurately detect the lock position and the unlock position of the lock member 16 by means of the magnet retaining member 51, which is made of a paramagnetic material, suppressing the influence of the screw-fitting member 50 on the magnetic field of the magnets 19 detected by the Hall sensors 71 to 74. Placing the Hall sensors 71 to 74 close to the slider 18 enables the size of the electric lock device to be reduced, thereby enabling the degree of freedom in layout of the electric lock device to be increased.

Furthermore, housed within the housing 14 is the position detection means 70 formed from the magnets 19 and the Hall sensors 71, 72, 73, and 74 disposed at fixed positions on the board 68 within the housing 14 so as to detect the position of the lock member 16 by means of the magnetic field of the magnets 19. Since the magnetic shielding member 75 made of a ferromagnetic material is fixed to the area, corresponding to the Hall sensors 71 to 74, of the inner faces of the housing main body 22 of the housing 14 so as to cover the Hall sensors 71 to 74 from the outside, even if a magnet other than the magnets 19 retained by the magnet retaining member 51 of the slider 18 is disposed in the vicinity of an outer face of the housing 14, which is made of a paramagnetic material, it is possible to prevent an erroneous detection from being caused by the external magnet affecting the Hall sensors 71 to 74, thereby enabling the position of the lock member 16 to be accurately detected.

As a result, when conditions for starting the engine are that the lock member 16 is at the unlock position in a state in which an ID set in a legitimate portable apparatus held by a vehicle user is verified against an ID set on the vehicle-installed engine side, in the event that a magnet is placed in the vicinity of the electric lock device in a state in which the vehicle user has temporarily left the portable apparatus within a vehicle compartment, it is possible to prevent the occurrence of a situation in which, in spite of the lock member 16 being at the lock position, it is erroneously detected as being at the unlock position, and the engine is started inadvertently.

An embodiment of the present invention is explained above, but the present invention may be modified in a variety of ways as long as the modifications do not depart from the spirit and scope thereof.

For example, the present invention is not limited to a steering lock device and may be applied widely as a vehicular electric lock device in which a lock member is engaged with an operating member so as to retain the operating member in a locked state.

The invention claimed is:

1. A vehicular electric lock device, comprising:
    an electric motor;
    a lock member that is capable of moving linearly between a lock position in which the lock member engages with an operating member and an unlock position in which the lock member is disengaged from the operating member;
    a threaded shaft that is rotatingly driven by the electric motor;
    a slider that has the threaded shaft screwed thereinto such that rotation of the threaded shaft by the electric motor causes the slider to move along an axis of the threaded shaft but not rotate around the axis, wherein the slider is operatively linked to the lock member such that movement of the slider along the axis of the threaded shaft results in the linear movement of the lock member between its lock and unlock positions;
    a magnet that is provided in the slider; and
    a magnetic sensor that detects by means of a magnetic field of the magnet that the lock member is in at least one of the lock position and the unlock position,
    wherein the slider comprises:
        a screw-fitting member that is formed from a ferromagnetic material having a rigidity and has the threaded shaft screwed directly thereinto, and
        a magnet retaining member that is formed from a paramagnetic material, encloses the screw-fitting member to suppress the influence of the screw-fitting member on the magnetic field of the magnet that is detected by the magnetic sensor, and retains the magnet therein, and wherein the magnet retaining member is coupled to the screw-fitting member such that the magnet retaining member and the screw-fitting member are movable together along the axis of the threaded shaft when the threaded shaft is rotated by the electric motor.

2. The vehicular electric lock device according to claim 1, wherein the threaded shaft and the slider are present between the electric motor and the lock member so as to convert rotary motion of the threaded shaft into linear movement of the lock member, wherein the electric motor, the threaded shaft, the slider, and the magnetic sensor are housed within a housing that supports the lock member, wherein the housing is made of a magnetic material, and wherein a magnetic shielding member is fixed to an area of inner faces of the housing so as to cover the magnetic sensor.

* * * * *